Sept. 2, 1952     W. T. STEPHENS     2,608,986
FLUID FLOW CONTROL VALVE
Filed July 23, 1945
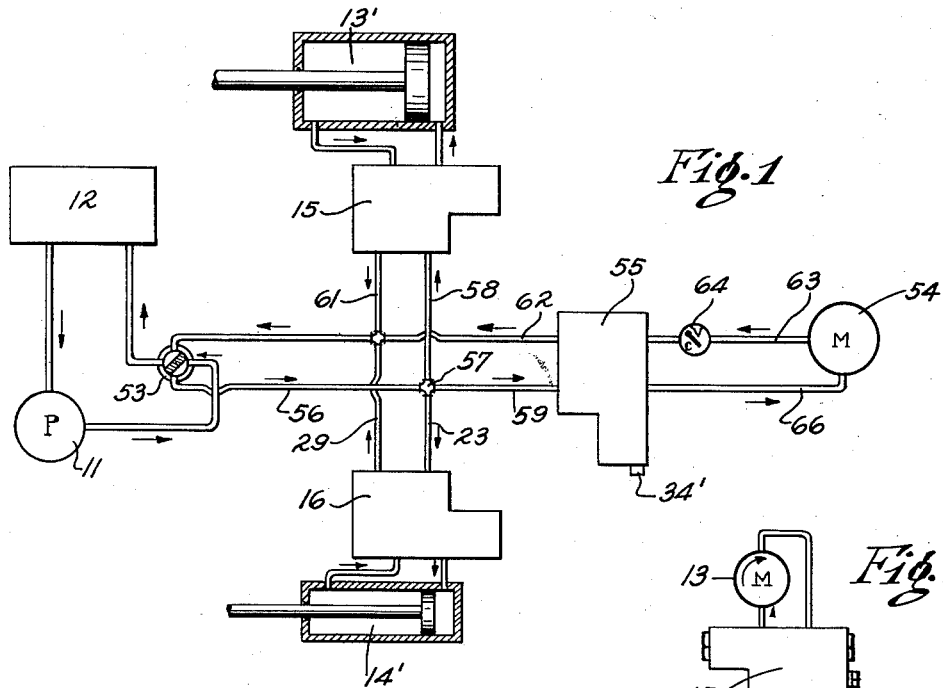
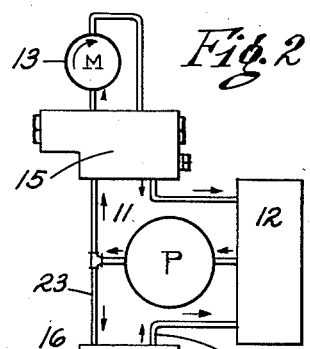
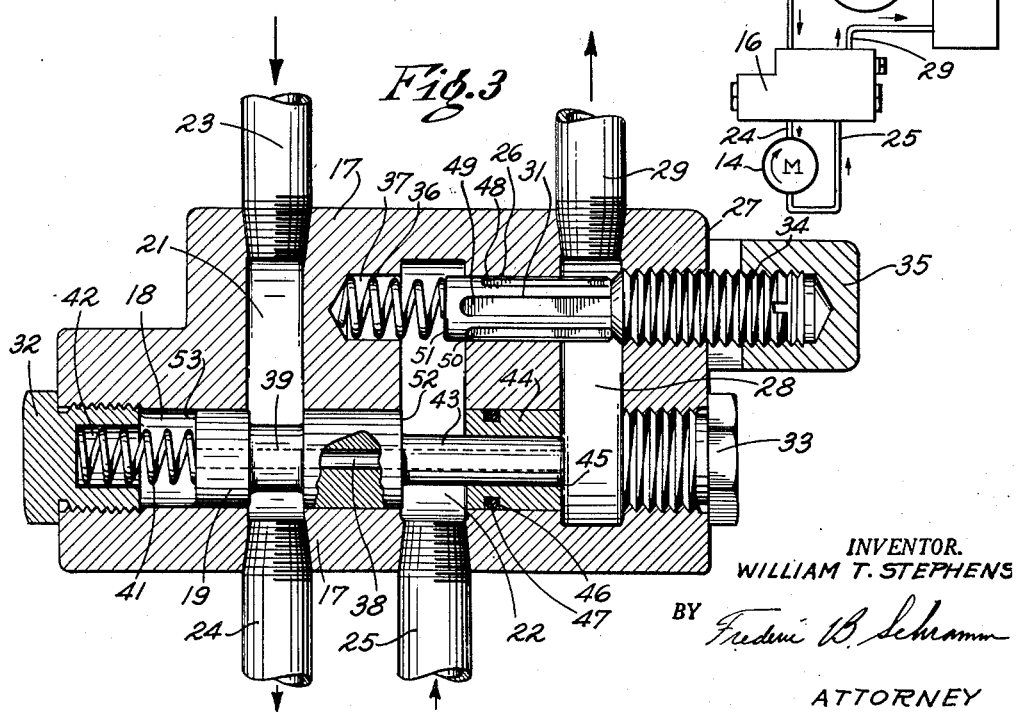
INVENTOR.
WILLIAM T. STEPHENS
BY Frederic B. Schramm
ATTORNEY Patented Sept. 2, 1952

2,608,986

UNITED STATES PATENT OFFICE 2,608,986

FLUID FLOW CONTROL VALVE

William T. Stephens, Painesville, Ohio

Application July 23, 1945, Serial No. 606,585

3 Claims. (Cl. 137—102)

My invention relates to fluid flow control valves.

It is an object of my invention to provide an improved valve for regulating the flow of fluid to a fluid operated device and controlling its speed.

A further object of the invention is to provide a fluid regulating valve and a speed control valve for fluid operated apparatus which is responsive to return flow pressure, or to rate of flow.

A further object of the invention is to provide a valve which renders the operation of the fluid utilizing apparatus of a hydraulically operating system relatively independent of variations in pressure of the common fluid supply source.

Other and further objects, features and advantages of the invention will become apparent as the description proceeds.

Fluid flow control valves constructed in accordance with my invention permit the utilization of a common source of fluid pressure to supply two or more fluid utilizing devices, and make it possible to provide a common reservoir for receiving the return fluid.

In order to cause each fluid utilizing apparatus to operate at its proper speed, regardless of the power and the fluid consumption requirements thereof, I provide fluid regulating valves in the supply lines from the common fluid pressure source to the several fluid utilizing devices. In each of the regulating valves, I provide means connected in the return lines of the fluid utilizing devices for automatically controlling the setting of the regulating valve in accordance with the fluid return, so that each fluid utilizing device is supplied with only enough fluid to perform the required amount of work and no extra pressure is left in the return fluid.

A better understanding of the invention will be afforded by the following detailed description considered in conjunction with the accompanying drawing in which Fig. 1, is a schematic diagram of a fluid pressure operated system in accordance with my invention, employing a common fluid pressure source, and a plurality of fluid utilizing devices, one of which serves for regulating the fluid consumption of the remaining devices.

Fig. 2 is a schematic diagram of a fluid pressure operated system having a plurality of fluid operated devices, with means for distributing the fluid supply of said devices in a fixed ratio and controlling the relative speeds of the devices, Fig. 2 being illustrative of an embodiment of the invention suitable for application in welder controls, and Fig. 3 is a sectional view of a fluid flow and speed regulating valve in accordance with my invention employed for controlling speeds in the systems of Figs. 1 and 2.

Like reference characters are utilized throughout the drawing to designate like parts.

Referring to the drawing, Fig. 2 illustrates a fluid pressure operated system causing a plurality of fluid operated devices to run at a substantially fixed ratio of speeds with the absolute speeds determined by the speed of its fluid pressure producing pump. It illustrates an arrangement such as may be employed in welder controls, for example, for regulating the rate of feed of the electrodes and the work.

As illustrated in Fig. 2 there is a pump 11 for drawing fluid from a common reservoir 12 and supplying fluid under pressure to a pair of fluid-pressure-utilizing devices such as fluid motors 13 and 14, for example. Although the invention is not limited to a hydraulic system or to utilization of a particular type of hydraulic fluid, for the sake of illustration, it will be described in connection with the use of oil as the distributed fluid, the devices 13 and 14 being oil motors in the case of the embodiment of Fig. 2. Fluid-flow and speed-control valves 15 and 16 are provided for regulating the flow of fluid to the oil motors 13 and 14, respectively. The valves 15 and 16 are preferably arranged for automatically regulating the flow of fluid in accordance with the rate of flow and pressure of fluid returned to the reservoir 12. The arrangement and construction of the valves 15 and 16 are shown in greater detail in Fig. 3.

Referring to Fig. 3, the form of valve there shown by way of illustration comprises a valve body 17 having a bore 18 extending longitudinally through the body 17, and containing a slidably mounted plunger 19. The bore 18 is intersected by a fluid supply passageway 21 extending transversely across the body 17. It is also intersected by a return fluid entrance passageway 22 extending partially through the body 17. The supply passageway 21 is connected to inlet and outlet conduits 23 and 24. The fluid return passageway has an inlet connection from a return conduit 25 and extends partially through the body 17 to a bore 26 which extends from one end 27 of the body 17 partially through the body intersecting the passageway 22, but not intersecting the passageway 21. A return-fluid exit passageway 28 is provided which extends partially through the valve body 17 from an intersection with the bore 18 to a connection to an outlet return flow conduit 29. The passageway 28 also intersects the bore 26 and a fluted piston 31 is mounted in the bore 26 for forming an orifice whereby a return passageway is formed from the conduit 25 to the conduit 29 including the orifice around the fluted piston 31.

For closing the ends of the longitudinal through bore 18, the ends of the bore are threaded and screw plugs 32 and 33 are provided. The plug serves also to prevent the plunger 19 from moving so far to the right as to restrict excessively the flow of fluid through the passageways 21 and 22. A screw 34 with a lock nut in the form of a screw cap 35 is provided for adjusting the longitudinal position of the fluted orifice piston 31, and closing the passageway 28 at the end 27 of the body 17. A compression spring 36, resting in a socket 37 is provided for holding the fluted piston 31 against the adjusting screw 34.

The plunger 19 is provided with a longitudinal central opening 38 for relieving differences in pressure at the ends of the plunger 19. In order to regulate the flow of fluid through the supply passageway 21, the plunger 19 is so constructed as to leave an open passageway when the plunger 19 is in a predetermined position, and to close the passageway partially as the plunger 19 is deflected from such a position. For example, an opening may be cut through the plunger 19 transversely, registering with the supply passageway 21 when the plunger 19 is in the predetermined full-open position, or the plunger 19 is appropriately recessed as illustrated. In the specific construction illustrated, the plunger 19 simply has its diameter reduced to form a neck portion 39 which registers with the passageway 21 when the plunger 19 is in the longitudinal position illustrated in Fig. 3.

For yieldingly urging the plunger 19 toward the full-open position which is illustrated, or biasing it to the open valve position, a suitable means such as a compression spring 41 is provided fitting between a socket 42 in the screw plug 32 and the left hand end of the plunger 19. The spring 41 is illustrated in Fig. 3 in the position in which it is substantially fully extended.

The plunger 19 is also relieved so as to expose a portion, at least, of the transverse surface thereof to the fluid in the return passageway 22 so that any back pressure in this passageway serves to oppose the biasing spring 41 and move the plunger 19 toward the left to throttle the supply pasageway 21. As illustrated, the plunger 19 is provided with a reduced diameter stem portion 43 which extends through the passageway 22 and through the portion of the bore 18 between the passageways 22 and 28. This portion of the bore may be decreased in diameter to correspond to the diameter of the stem 43, but for the sake of more ready and more accurate machinability of the bore, a reducer 44 is utilized for providing a reduced diameter bore 45 to receive the stem portion 43 of the plunger 19.

The reducer 44 is in the form of a hollow cylinder or bushing having an outer diameter to correspond to the inner diameter of the bore 18, and having an inner bore 45. An annular groove 46 is cut in the reducer 44 and the groove 46 is filled with a ring 47 composed of fluid-absorbing substances such as a natural rubber, for example, of the composition employed in solid truck tires which tends to absorb the oil ordinarily employed as an operating fluid. In this manner, upon absorption of fluid by the ring 47, the bushing 44 is tightly held in place by the expansion of the ring 47.

In forming the flutings in the fluted orifice piston 31, a plurality of longitudinal grooves are formed on the cylindrical surface of the piston 31 around the periphery thereof. However, in order to facilitate variations in orifice effect by longitudinal movement of the piston 31, the ends 48, 49 and 50, for example, of different longitudinal grooves, are placed at different distances from the end 51 of the piston 31.

The manner in which the valve 16 controls the speed of the oil motor 14 will be understood more readily from a consideration of Figs. 2 and 3. If it be assumed that the oil motor 14 is subjected to a heavy mechanical load, or is carrying a heavy mechanical load, so that substantially the entire input fluid pressure from the conduit 24 is opposed by the torque or pressure of the mechanical load, the fluid pressure in the return conduit 25 will be relatively low. Furthermore, there will be no tendency for the oil motor 14 to run away or operate at a speed greater than that for which it was designed. Likewise, there will be no tendency for an excessive flow of oil through the return conduit 25 greater than the loaded flow capacity of the oil motor 14. The piston 31 in the speed control valve is appropriately adjusted by means of the adjusting screw 34 so as to produce an orifice opening which will readily pass the rated oil flow of the motor 14, and there will be substantially no back pressure in the portion 22 of the return passageway in the valve body 17. Accordingly, the plunger 19 will remain in the full open position in which it is illustrated in Fig. 3.

If, however, the load upon the motor 14 should be relieved, or if the oil pressure of the supply line 23 should become greater by reason of increasing speed of the pump 11, or decreasing consumption of oil by the other oil motor 13, the rate of oil flow through the return conduit 25 will increase and the fluid pressure in the portion 22 of the return flow passageway in the valve body 17 will increase. The pressure acting upon the transverse surface portion 52 of the plunger 19 will be increased. (The pressure acting upon the corresponding portion of the end 53 of the plunger 19 will be no greater than that in the passageway 28, owing to the fact that the pressure is equalized between the screw plug 32 and the passageway 28 by the opening 38 through the plunger 19.) This action deflects the plunger 19 toward left against the pressure of the spring 41 and partially closes the supply passageway 21. The resultant reduction in the flow of oil reduces the speed of the motor 14, and also reduces the pressure of the oil in the return line 25. After the plunger 19 has been moved sufficiently to throttle the supply passageway 21 to the extent required to reduce the flow of oil to the rated amount through the motor 14 for which the orifice piston 31 is set, the difference in pressure between the passageways 22 and 28 will become negligible or reduced to a value only sufficient to overcome the force of the spring 41 with the required degree of throttling.

In this manner the relative speeds of the motors 13 and 14, or their relative oil consumptions are maintained at the desired value, regardless of the loads upon the devices 13 and 14 and regardless of the oil flow required by either of the devices for driving its rated load.

It will be observed that in the speed control valve constructed as described and as illustrated in Fig. 3, a type of check valve operation is obtained in that fluid regulation and speed regulation are obtained with the pump 11 running in such a direction as to produce oil flowing in the direction of the arrows.

If the direction of oil flow is reversed, the oil pressure in the conduit 29 acting upon the piston 31 will tend to deflect it against the force of the spring 36, thus producing a full open condition of the orifices by having all the grooves communicating with the passageway 22. The oil pressure in the passageways 28 and 22 will then be substantially the same, and since the oil pressure is equalized with that at the other end of the plunger 19 by the relief aperture 38, the plunger 19 will be deflected to the full open position by the spring 41 causing unregulated operation of the fluid pressure utilizing devices 13 and 14. If this type of operation should be desired to only a modified degree, the spring 36 may be made relatively heavy; or if this type of operation is not desired at all, the piston 31 may be secured in the bore 26 in any suitable manner, for example, by making the piston 31 and the set screw 34 integral.

Although in Fig. 2 the oil utilizing devices 13 and 14 have been represented as oil motors, the invention is not limited thereto, for example, as illustrated in Fig. 1, the two corresponding oil utilizing devices may be a relatively large hydraulic operator 13' and a smaller hydraulic operator 14' of the cylinder and moving piston type.

As previously pointed out in the arrangement of Fig. 2, the relative speeds of the devices 13 and 14 are automatically maintained, but the absolute speed will vary in proportion to the speed of the pump 11. The invention is not limited to this arrangement. Fig. 1, for example, illustrates a system in which the absolute speeds as well as the relative speeds of oil utilizing devices 13' and 14' may be maintained at desired values irrespective of the loads of the devices 13' and 14' and irrespective of the speed and fluid pressure produced by the pump 11 within reasonable limits.

In this case there is a four-way shut-off valve 53 for reversing the direction of flow of oil from the pump 11 through the oil utilizing devices back to the reservoir 12 when the devices are to be run in reverse.

In the arrangement of Fig. 1, an additional fluid pressure consuming device, such as an oil motor 54, for example, is provided having an additional speed regulating valve 55 like the valve of Fig. 3. In this case the fluid pressure utilizing devices 13', 14' and 54 are supplied from a common input conduit 56 divided at a cross fitting 57 into three conduits 58, 23 and 59. Similarly, there are return conduits 61, 29 and 62 from the devices 13', 14' and 54, respectively. The oil motor 54 is, in this case, arranged as an idler for the purpose of taking up any fluid flow not required for operating the devices 13' and 14' at their rated speeds, or the speeds for which their regulators 15 and 16, respectively, are set. In this case the desired absolute speed of the devices 13' and 14' is set by adjustment of the adjusting screw 34 of the speed regulator 55 so the idler motor 54 is ready to take up the excess capacity of the pump 11. The regulators 15 and 16 are first adjusted to give the desired speed of the operators 13' and 14'. The regulator 55 is then adjusted by opening its orifice just enough to make the pressure difference between lines 59 and 66 relatively small.

Preferably, the speed regulator 55, in this case, is provided with a control spring 41, referring to Fig. 3, which is relatively weak so that slight variations in pressure from the pump 11 will produce a wide variation in oil flow consumed by the idler motor 54 in comparison with the hydraulic operators 13' and 14'. Other suitable means may be employed for giving the regulator 55 a relatively steep regulation curve and the governors 15 and 16 relative close regulation with a flat curve. Therefore, with the spring 41 made weak, if the devices 13' and 14' are operating under such load as to leave very little excess fluid pressure, or if the supply pump 11 is operating at reduced power so as to leave negligible excess pressure, the small pressure acting in the return line 63 will still be sufficient to deflect the plunger 19 and cut down the flow of oil to the motor 54.

Even if the speed regulating devices 15 and 16 and 55 are adjusted for the same degree of regulation, it will be apparent that with the oil motor 54 idling and with the devices 13', 14' and 54 operating in the same speed ratio, if slight variation in pressure in the source 11 should take place, the regulators 15 and 16 of the loaded devices 13' and 14' will cut off more oil flow in proportion than the regulator 55 of the unloaded or idling motor 54 so that the speeds of the devices 15 and 16 will remain relatively little affected by slight changes in the output of the pump 11.

Preferably, a check valve 64 is connected in the output or return line 63 of the idler motor 54. When the valve 53 is turned to reverse the flow of oil, the check valve 64 prevents flow of oil through the motor 54, and the pistons of the hydraulic operators 13' and 14' are returned to their starting positions.

I have herein shown and particularly described certain embodiments of my invention and certain methods of operation embraced therein for the purpose of explaining its principle of operation and showing its application, but it will be obvious to those skilled in the art that many modifications and variations are possible and I aim, therefore, to cover all such modifications and variations as fall within the scope of my invention which is defined in the appended claims.

What is claimed is:

1. A fluid flow control valve for fluid operated apparatus comprising, in combination, a body having a longitudinal bore therein extending through the body from one end to the other and having a uniform diameter with end portions of the bore having threads cut therein from said diameter, a plunger slidable in the said bore, the body having a transverse passageway intersecting said bore adapted for connection to a supply conduit at one end and to an outlet conduit at the other end, a second transverse passageway intersecting said bore for connection to a return conduit, a third transverse passageway adapted to connect with said return conduit intersecting said bore and having a longitudinally extending portion intersecting said second transverse passageway, said portion of the third passageway having an orifice means therein constituting a restriction, said plunger having a portion of reduced diameter aligned with said supply passageway in a given position of the plunger, and an unreduced portion adapted to close said supply passageway when the plunger is moved from said given position by a pressure difference across the orifice means, a stem portion on the plunger extending longitudinally in the bore from said unreduced portion, threaded plug means for closing the ends of said bore, a sleeve fitted in the portion of the said bore between said second and third transverse passageways for receiving the stem on the said plunger, in a substantially fluid tight manner sealing means for sealing the sleeve in the longitudinal bore for closing communication between said second and third passageways through said longitudinal bore, fluid communication means between the third passageway and the end of the bore opposite to the stem, and biasing means opposing movement of the plunger from said given position by the pressure difference.

2. A fluid flow control valve for fluid operated apparatus comprising, in combination, a body having a longitudinal bore therein extending through the body from one end to the other and having a uniform diameter with end portions of the bore having threads cut therein from said diameter, a plunger slidable in the said bore, the body having a transverse passageway intersecting said bore adapted for connection to a supply conduit at one end and to an outlet conduit at the other end, a second transverse passageway intersecting said bore for connection to a return conduit, a third transverse passageway adapted to connect with said return conduit intersecting said bore and having a longitudinally extending portion intersecting said second transverse passageway, said portion of the third passageway having an orifice means therein constituting a restriction, said plunger having a portion of reduced diameter aligned with said supply passageway in a given position of the plunger, and an unreduced portion adapted to close said supply passageway when the plunger is moved from said given position by a pressure difference across the orifice means, a stem portion on the plunger extending longitudinally in the bore from said unreduced portion, threaded plug means for closing the ends of said bore, a sleeve fitted in the portion of the said bore between said second and third transverse passageways for receiving the stem on the said plunger, in a substantially fluid tight manner sealing means for sealing the sleeve in the longitudinal bore for closing communication between said second and third passageways through said longitudinal bore, said stem portion forming a shoulder on the plunger facing the third passageway for impingement by the fluid pressure in the third passageway whereby the plunger is actuated away from the given position by an increase in fluid pressure within the third passageway, fluid communication means between the third passageway and the end of the bore opposite to the stem, and resilient means for resisting the displacement of the plunger whereby the position of the plunger and amount of closure of the first passageway is proportioned to the fluid pressure in the third passageway.

3. Apparatus as in claim 2 having the orifice means adjustable for varying the restriction in the third passageway.

WILLIAM T. STEPHENS.

REFERENCES CITED

The following references are of record in the file of this patent:

UNITED STATES PATENTS

| Number | Name | Date |
|---|---|---|
| 371,063 | Hays | Oct. 4, 1887 |
| 1,467,522 | Amsler | Sept. 11, 1923 |
| 1,579,600 | Durante | Apr. 6, 1926 |
| 1,905,132 | Bishop | Apr. 25, 1933 |
| 1,923,595 | Temple | Aug. 22, 1933 |
| 1,938,287 | Frantz | Dec. 5, 1933 |
| 1,964,196 | Cuttat | June 26, 1934 |
| 2,001,988 | Temple | May 21, 1935 |
| 2,146,537 | Farnham | Feb. 7, 1939 |
| 2,255,787 | Kendrick | Sept. 16, 1941 |
| 2,306,379 | Conradson | Dec. 29, 1942 |
| 2,317,563 | Tucker | Apr. 27, 1943 |
| 2,321,000 | Bennett | June 8, 1943 |
| 2,365,892 | McLeod | Dec. 26, 1944 |

FOREIGN PATENTS

| Number | Country | Date |
|---|---|---|
| 232,349 | Great Britain | of 1924 |